United States Patent
Joliveau et al.

(10) Patent No.: US 11,706,146 B1
(45) Date of Patent: Jul. 18, 2023

(54) DIRECTING NETWORK TRAFFIC USING LOCAL ROUTING DECISIONS WITH A GLOBAL OVERVIEW

(71) Applicant: Amazon Technologies, Inc., Seattle, WA (US)

(72) Inventors: Marc Joliveau, Edmonds, WA (US); Stefan Christian Richter, Seattle, WA (US); Ali Khayam, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/023,683

(22) Filed: Sep. 17, 2020

(51) Int. Cl.
*H04L 47/125* (2022.01)
*H04L 47/17* (2022.01)

(52) U.S. Cl.
CPC .......... *H04L 47/125* (2013.01); *H04L 47/17* (2013.01)

(58) Field of Classification Search
CPC .............................. H04L 47/125; H04L 47/17
See application file for complete search history.

(56) References Cited

U.S. PATENT DOCUMENTS

| | | | |
|---|---|---|---|
| 11,128,561 B1* | 9/2021 | Matthews | H04L 47/6255 |
| 2016/0285932 A1* | 9/2016 | Thyamagundalu | H04L 12/4633 |
| 2020/0296026 A1* | 9/2020 | Michael | H04L 45/745 |
| 2021/0359941 A1* | 11/2021 | Byrapura Doddegowda | H04L 45/745 |
| 2021/0409849 A1* | 12/2021 | Lazar | H04L 41/149 |

* cited by examiner

*Primary Examiner* — Kibrom T Hailu
*Assistant Examiner* — Nizam U Ahmed
(74) *Attorney, Agent, or Firm* — Klarquist Sparkman, LLP

(57) ABSTRACT

Programming routers in a network is accomplished using a global network manager and a plurality of local network managers. The global network manager analyzes an entire network and demand matrix in order to provide restrictions and recommendations that are communicated to a set of the local network managers. The local network managers can use the restrictions and recommendations to make local routing decisions defining a percentage of traffic routed to each neighboring node. The local network manager collects traffic metrics, such as local topology and traffic information by measuring the capacity available to reach any neighboring node. The local network manager uses the metrics in combination with the restrictions and recommendations from the global manager to make decisions on how to route network traffic.

20 Claims, 7 Drawing Sheets

DIRECTING NETWORK TRAFFIC USING LOCAL ROUTING DECISIONS WITH A GLOBAL OVERVIEW

BACKGROUND

Using pre-calculated end-to-end tunnels is a common approach used to route packets over large computer networks connecting thousands of routing devices. The end-to-end tunnel is defined by a series of consecutive links in the network that connect an entry point (source) to an exit point (destination). Traffic is allocated to the pre-calculated route joining the tunnel source to its destination. The tunnel constrains packets to travel through a single deterministic set of links without deviation. For example, if a link is down, the packet is dropped.

Routing through the network is typically chosen using the shortest path. But as the packet is routed through the network, conditions can change, such as congestion or link outage. As a result, current tunneling solutions are inefficient.

DETAILED DESCRIPTION

End-to-end traffic routing that traverses the network without adapting to instantaneous network conditions is inefficient and can result in lost packets. Instead, in embodiments described herein, a global network manager analyzes an entire network and demand matrix in order to provide restrictions and recommendations that are communicated to a set of local network managers. The local network managers can use the restrictions and recommendations to make local routing decisions defining a percentage of traffic routed to each neighboring node. The local network manager collects traffic metrics, such as local topology and traffic information by measuring the capacity available to reach any neighboring node. The local network manager uses the metrics in combination with the restrictions and recommendations from the global manager to make decisions on how to route network traffic.

One advantage of using the local network manager to make routing decisions is that the routing is not fixed, but changes dynamically while a packet traverses a network. More specifically, the local network managers can react to network events (e.g., a broken link) to improve a speed of adapting to the network events, thereby allowing traffic engineering to be more scalable, as a single global network manager can become overloaded as the network grows. Additionally, after the packet leaves the source server computer, the packet's routing can dynamically change based on local topology.

Figure 1:
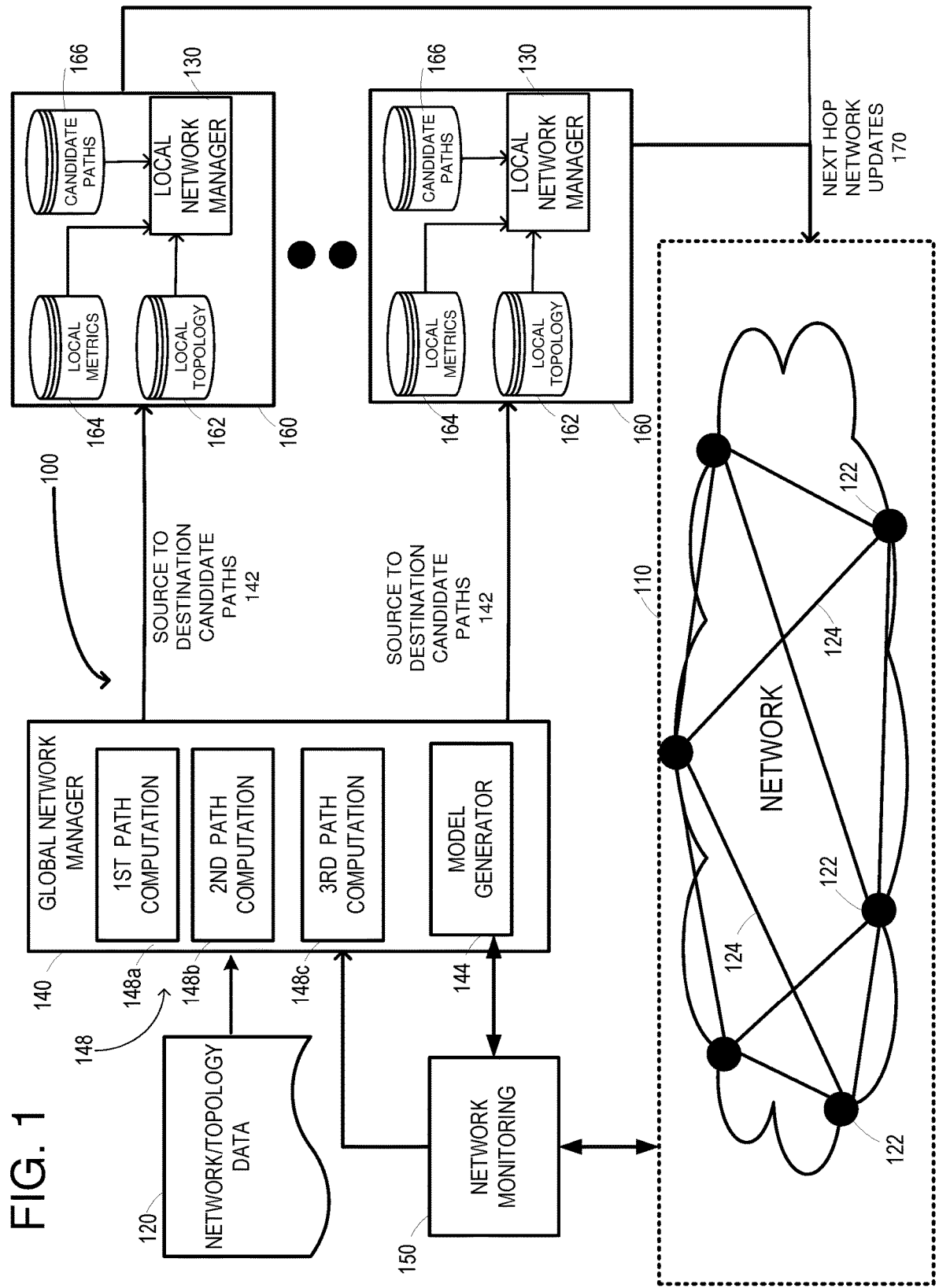
FIG. 1 is a system diagram showing a global network manager providing traffic suggestions to a plurality of local network managers.

FIG. 1 is an embodiment of a system 100 used to create views of a network 110 (e.g., a backbone network) for use in performing path computation in the network. At 120, network/topology data is received, such as from a database. The network/topology data may include information that describes the structure of an actual network 110 and/or the configurations that are applied to the network 110. The network/topology data 120 can include physical or logical structural information for the network. Example physical structural information can include network device types, link distances, link types, geographic locations, signal types, transmission rates, etc. The logical structural information describes how data flows through the network 110. For example, the network/topology data may include operating parameters/status of the links and nodes, including latency, capacity, error/dropped packet rates, and other parameters. Example configurations of the network that may be included in the network/topology data 120 include distribution/connectivity of nodes/links, software versions (applications and operating system versions), variables, policies, protocols used, protocol parameters, frequency, speed, interface settings, etc. Thus, the network/topology data 120 can be virtually anything that is changeable remotely on the network devices to configure the network devices and virtually anything that is changeable over time during operation of the network.

The network 110 includes network devices (nodes), shown generally at 122, and links (e.g., paths), shown generally at 124, between the network devices. Although represented as a few network devices and links, the network 110 generally includes hundreds of thousands of such devices and links. The network devices 122 can include switches (multilayer or single-layer), routers, repeaters, gateways, network bridges, hubs, protocol converters, bridge routers, proxy servers, firewalls, network address translators, multiplexers, network interface controllers, wireless network interface controllers, modems, ISDN terminal adapters, line drivers, and wireless access points, for example. A network device can also include any device used for forwarding packet data through the network 110. The links 124 can be any optical, wireless or electrical cables for interconnecting network devices, such as Ethernet cables, or wireless connections. Typically, the network devices 122 and links 124 are logically grouped, such as in a data center (not shown in this figure, but described in FIG. 2), and links are coupled between the logical groupings. The logical groupings of network devices can be called "waypoints" and each waypoint can be separately controlled by one of a plurality of local network managers 130. An example waypoint is a data center, but other logical groupings can be formed. For example, multiple waypoints can be located in one data center. The local network managers 130, in turn, are controlled by a global network manager 140, which provides candidate paths 142 to each local network manager 130, as described further below.

A model generator 144 generates a network model periodically or as a result of an event using the network/topology data 120. The model represents the nodes and their interconnecting links in the network, together with their configuration, which may include routing metrics, such that it can be used to determine the paths that will be taken between any network source and destination pair. The model also includes latencies of the links and nodes, so that the latencies of these paths can also be determined. Using the network/topology data 120, the model generator 144 may generate a resultant network model, which includes a model in software and stored data of what the actual network 110 is expected to be. For example, the network model can be a database model, which can be viewed as a graph wherein relationship types are arcs and object types are nodes. The actual network 110 can deviate from the network model due to unexpected updates, interruptions, and failures to network devices or links in the network 110. The network model can be generated periodically (at fixed time intervals), such as once per 30 minutes, once per hour, etc. The network model can also be generated by the model generator based upon an event, such as an update to the network or detected failures in the network.

The model generated by model generator 144 may include multiple sub-models or views. For example, the model generator 144 may be configured to divide the network into regions and/or otherwise perform processing in consideration of the different regions of the network based on the topology data and generate different views for each region. Each view may correspond to a simplified representation of the region to enable efficient parallel path computations for the network as a whole. The model generator 144 can generate different path computations, shown generally at 148. In the illustrated example, three specific path computations 148a, 148b, and 148c are shown as first, second, and third path computations. The path computations 148 can be specific for each local network manager 130 and be included in the candidate paths 142 sent to the local network managers 130. The model generator 144 can use a path computation algorithm that efficiently computes k-shortest paths (e.g., using Yen's algorithm) according to one or more parameters and/or business rules (e.g., any combination of desired number of paths, maximum or minimum path length and cost, conditional allow/deny hops, etc.). In this way, path computations may be performed for each view/region of the network independently and in parallel, thereby increasing efficiency. The result is ranked candidate path options, which are provided to the local network managers 130. The output ranked best path options may have IP interface and next-hop information embedded in the resulting best path, and total cost may be included as well. The total cost may include latency, capacity (e.g., bandwidth), and/or a combination of latency, bandwidth, and/or other parameters.

The 1$^{st}$ path computation 148a can be a primary path in the ranking: Primary paths carry packets to their destination through a shortest path (i.e., least number of hops). The primary paths are expected to offer higher level of performance (e.g., shorter latency) while satisfying the expected global demand. The primary paths are the main routes the traffic is expected to use.

The 2$^{nd}$ path computation 148b can be a secondary path in the ranking: Secondary paths carry packets directly to their destination, but they offer a lower level of performance than primary paths. The secondary paths are implemented to provide options for the traffic to be routed in scenarios where some demands are higher than anticipated or the capacity between two waypoints is lower than anticipated. The secondary paths are optional routes that the traffic is expected to use due to higher than expected demand or loss of capacity that can be handled without leveraging bypass paths.

The 3$^{rd}$ path computation 148c can be a bypass path. The bypass paths carry packets from a waypoint to another waypoint in order to route the traffic around a failure. Bypass paths correspond to a route that is expected to be used when a link becomes unavailable, such as through malfunction. Bypass paths are optional routes that are expected to be used to replace a failing link.

The model generator 144 may be configured to generate the k best paths through the network from a latency perspective (e.g., having the lowest latency), from a capacity perspective (e.g., traversing links having a lowest capacity), and/or from a hybrid perspective (e.g., paths having a lowest latency among paths that are under a threshold capacity level). For example, an initial approach may include computing k-shortest paths up to a threshold number of alternative paths using a single cost variable (e.g., latency or capacity), prune those paths outside of the first variable scope, and then prune all those paths that do not comply with a second constraint. The k best paths may also be computed by providing a maximum path length or a maximum path computation time frame in order to limit the number of paths that are computed. For example, the quantity of paths in a given set of k best paths may be the quantity of shortest paths that are computed within the maximum path computation time frame using a shortest path computation algorithm.

A network monitoring server 150 can be configured to provide information regarding the network 110 to other components for monitoring network health and performing path computations for the network. For these purposes, the network monitoring server 150 can determine actual latency, capacity, and other operating parameters of the network 110. For example, the network monitoring server 150 can inject packets into the network 110 and determine an amount of time for the packets to traverse the network. Time stamps can be used at the source and destination nodes to determine the amount of traversal time. The network monitoring tool 150 may also request information from the network and/or the nodes of the network to determine the operating parameters. The output of the network monitoring tool 150 can include measured (or received) data. The measured data may be provided to the model generator 144 to be used to perform the operations described above. Changes in the network that may trigger an update of the model may be an addition, removal, or movement of a node or link in the network, a change in configuration of a node or link in the network, and/or a change in operating status of a node or link in the network.

The global network manager 140 aggregates the network and the demand at the level of the waypoints and then analyzes the aggregated network in order to provide an evaluation of each waypoint adjacent to the waypoint at issue. This can be achieved by iteratively building high-availability, low-latency paths in order to partially or fully satisfy the demand between pairs of waypoints. For example, a waypoint W' visited directly after another waypoint W on such a path can be evaluated as a potential neighbor for packets transiting via W in destination of the last waypoint D of the path. The latency and the bandwidth expected to be consumed by the path can be used to evaluate the relevance of W' as a neighbor of W for packets in destination of D. Such an approach can also eliminate traffic loops by ensuring that if a waypoint W' is visited after a waypoint W in a path to the destination waypoint D, no further path to be built for packets in destination of D is allowed to visit W' before W. Finally, the same approach can also be leveraged to proactively handle unexpected situations by inflating the demand between waypoints forcing the system to consider alternate paths. Adjacent waypoints on such paths are evaluated with a lower score and consequently are considered as secondary neighbors to which traffic is sent only after considering other better neighbors. The output of the global network manager can include an evaluation of the waypoints adjacent to any waypoint. An example output table is as follows:

| Local | Destination | Next Waypoint | Performance |
|-------|-------------|---------------|-------------|
| A | D | C | [30 ms; 200 Gbps] |
| A | D | B | [35 ms; 70 Gbps] |
| B | D | D | [20 ms; 75 Gbps] |
| B | D | D | [35 ms; 70 Gbps] |
| C | D | D | [30 ms; 200 Gbps] |
| A | B | B | [15 ms; 25 Gbps] |
| B | C | C | [7 ms; 50 Gbps] |

In this example, the performance metrics are extracted from the latency and the bandwidth carried by the path that lead the next waypoint to be considered as a neighbor of the local waypoint. For waypoint A, the performance metrics would be interpreted as follows: the first 200 Gbps of traffic in destination of D is expected to reach D in 30 ms by being sent to the waypoint C, the next 70 Gbps of traffic in destination of D is expected to reach D in 35 ms by being sent to the waypoint B, and the first 25 Gbps of traffic in destination of B is expected to reach B in 15 ms by being sent to the waypoint B.

Although the global component does not determine the traffic share sent to any link of the network, by controlling the evaluation of the adjacent waypoints of all waypoints, the global component implicitly controls which links are more likely to carry a small or large share of the traffic heading to a given destination, and which links are not allowed to carry any share of traffic for a given destination. This information is represented in FIG. 1 as the candidate paths 142, which are full paths from a source to a destination and generally include multiple hops.

The candidate paths 142 are supplied to each waypoint 160 that is locally controlled by its respective local network manager 130. Each waypoint can include one or more databases, such as a local topology database 162, a local metrics database 164 and a candidate paths database 166. The local topology database 162 primarily provides link and node information particular to the respective waypoint. For example, if the waypoint is a datacenter, the topology information can be particular to that datacenter. The topology information can include network device types, link distances, link types, signal types, transmission rates, etc. in the waypoint. The local metrics database 164 can also be associated with local waypoint and can include latency, capacity, error/dropped packet rates, and other parameters. The candidate paths database 166 can include the candidate paths 142 received from the global network manager 140. The candidate paths database 166 can also include an evaluation of the waypoint's neighbors provided by the global network manager. Thus, the global network manager can analyze the global topology of the network and the global demand in order to evaluate the adjacent waypoints of every waypoint. The adjacent waypoint information allows the local network manager to evaluate its direct neighbor information provided by the global network manager.

The local network manager 130 uses the local metrics 164, the local topology information 162 and the candidate paths to make decisions regarding routing of network traffic from the local waypoint to a neighbor waypoint (a next-hop decision). The routing decisions can include a percentage of traffic that traverses different links. The local network manager 130 can take a main path provided by the global network manager 140 and evaluate sub-paths of the main path. For example, a path A->B->C->D can be decomposed in 3 sub-paths:
1) A->B->C->D
2) B->C->D
3) C->D Sub-paths are associated with the local metrics 164 that enable the local network manager 130 to take traffic decisions. These metrics can include information about the capacity available in the links of the sub-path for traffic going to a specific destination and information about the expected performance of the sub-path (e.g., latency to reach destination, risk of encountering congestion, primary/secondary option, etc.).

In one embodiment, each local network manager solves a bin-packing problem where multiple demands to multiple waypoints are allocated to a series of links between the local waypoint and its adjacent waypoints. This problem is solved under the guidance of the neighborhood evaluation from the global network manager indicating which adjacent waypoints are likely to be a good next place for the traffic to be sent according to its destination, as well as which adjacent waypoint is not to be considered for any destinations. A simple approach to solve this bin packing problem is to process each destination iteratively, select the adjacent waypoint with the lowest latency and enough remaining bandwidth to carry a portion of the demand or its totality, and then distribute the allocated demand over the multiple links to the selected next waypoint such that they have a similar proportion of their bandwidth consumed. Once all demand has been allocated, the traffic for each destination allocated to each link is divided by the total local demand to the destination, normalizing the traffic allocated on the link into a traffic share (i.e., a percentage).

One goal of the local network manager 130 is to calculate a weight to determine a percentage of traffic routed to a given destination sent over a link connecting a neighbor waypoint. An example table is shown below including evaluations that can be performed for the path and sub-paths:

| Source | Destination | Sub-path | Latency | Bandwidth | Congestion Risk | Rank | BW consumption |
|--------|-------------|----------|---------|-----------|-----------------|------|----------------|
| A | E | A→C→E | 5 | 70 | Low | Primary | [35%, 70%] |
| A | E | A→D→F→E | 9 | 25 | Low | Primary | [25%, 25%, 25%] |
| A | E | A→C→E | 5 | 15 | High | Primary | [7.5%, 15%] |
| A | F | A→C→F | 3 | 6 | High | Secondary | [3%, 6%] |
| A | G | A→B→E→G | 7 | 200 | Low | Primary | [100%, 66.6%, 100%] |
| A | G | A→C→F→G | 8 | 100 | Low | Primary | [50%, 100%, 66.6%] |
| A | G | A→C→D→F→G | 11 | 25 | Low | Primary | [12.5%, 12.5%, 25%, 8.3%] |
| A | G | A→D→H→G | 12 | 25 | Low | Primary | [25%, 12.5%, 25%] |

| Source | Destination | Sub-path | Latency | Bandwidth | Congestion Risk | Rank | BW consumption |
|---|---|---|---|---|---|---|---|
| A | G | A→C→E→G | 6 | 50 | High | Primary | [25%, 50%, 25%] |
| A | G | A→B→E→G | 7 | 80 | High | Primary | [40%, 26.6%, 40%] |
| A | Bypass A→D | A→C→E→F→D | 10 | 50 | High | Bypass | [25%, 50%, 50%, 50'%] |
| A | Bypass_A→D | A→B→E→F→D | 11 | 50 | High | Bypass | [25%, 16.6%, 50%, 50%] |
| A | Bypass F→D | A→D | 4 | 50 | Low | Bypass | [50%] |
| A | Bypass F→D | A→D | 4 | 50 | High | Bypass | [50%] |
| B | E | B→E | 4 | 100 | Low | Primary | [33.3%] |
| B | E | B→A→C→E | 7 | 45 | Low | Primary | [22.5%, 22.5%, 45%] |
| B | E | B→E | 4 | 35 | High | Primary | [11.6%] |
| B | E | B→C→F→E | 5 | 18 | High | Secondary | [9%, 18%, 18%] |
| B | G | B→E→G | 5 | 200 | Low | Primary | [66.6%, 100%] |
| B | G | B→C→D→H→F→G | 20 | 100 | Low | Primary | [50%, 50%, 50%, 50%, 33.3%] |
| B | G | B→E→G | 5 | 80 | High | Primary | [26.6%, 40%] |
| B | G | B→C→E→G | 6 | 35 | High | Primary | [17.5%, 35%, 17.5%] |
| B | Bypass A→D | B→E→F→D | 9 | 50 | High | Bypass | [16.6%, 50%, 50%] |
| B | ByPass_F→D | B→A→D | 6 | 50 | Low | Bypass | [25%, 50%] |

Evaluations by the local network managers 130 can be performed at a higher frequency than the global network manager 140. For example, the local network managers 130 can modify path percentages every 1 minute or less, while the global network manager 140 generates candidate paths 142 several times an hour. The local network managers 130 are focused on a subset of the entire network and focus only on their respective waypoint. Additionally, the local managers 130 decide a percentage of traffic to any destination that transit or originates from the local waypoint to another waypoint. The local network managers 130 distribute the traffic to minimize polarization and decrease the risk of congestion. The bypass paths allow the local network managers 130 to dynamically adjust traffic routing in a capacity-aware way based on the current traffic expected on any link. The local network managers calculate weights that can be used to determine percentages. The weights are calculated using any desired algorithm, such as an algorithm having bandwidth, latency, and the ranking of candidate paths as parameters. An example of percentages calculated by a local network manager 130 is as follows:

| Device to device link | Destination waypoint | Traffic share |
|---|---|---|
| A-r1->C-r3 | D | 37% |
| A-r2->C-r4 | D | 37% |
| A-r1->B-r4 | D | 19.5% |
| A-r2->B-r3 | D | 6.5% |
| A-r1->B-r4 | B | 75% |
| A-r3->B-r3 | B | 25% |

Once the local network manager 130 determines the percentages for the next waypoint, the local network manager can program the network devices in the network 110 with the appropriate next waypoint (e.g., next hop) information as shown at 170.

Using local routing decisions, a packet's end-to-end path is not fixed and can change dynamically while the packet is in route. The flexibility provided by dynamically routing packets from a series of local waypoint decisions improves velocity to react to impacting network events while making traffic engineering more scalable. These routes are built dynamically by evaluating the routing decision based on the most recent information collected locally. Such flexibility can improve the reactivity to adjust routing policies to unexpected events, such as large traffic fluctuation (e.g., demand spike) or capacity loss (e.g., fiber cut).

For example, in fixed end-to-end tunnel schemes, even if a link failure can be detected quickly from the device connected to the failing link, propagating the awareness of a failure to other devices takes time, especially if these devices are physically far from the point of failure. If the traffic is routed via end-to-end tunnels, packets will be sent to any deficient tunnel that includes a failing link until the failure event is reported to the device hosting the tunnel (i.e., the source of the tunnel). This can take time as this device may be thousands of miles away from the failure. However, using the embodiments herein, the traffic is routed via local policy and the time to react to a link failure is much shorter because only the steering decisions taken at the waypoints at the extremities of the failing link must be adjusted, and these waypoints are very close to the point of failure. In addition to detecting unexpected events faster, using local routing policy also minimizes the convergence time to get back to a stable state after a link failure. More specifically, in the end-to-end tunnel routing model, all the tunnels that were using a failing link must be recalculated, whereas using local routing policy only the policies in the waypoints adjacent to the failing link are adjusted. Steering the traffic locally also improves scalability because local policies are restricted to local decisions (i.e., how to consume the links between a waypoint and its adjacent waypoints), whereas a system defining end-to-end routes must be aware of the entire network.

Figure 2:
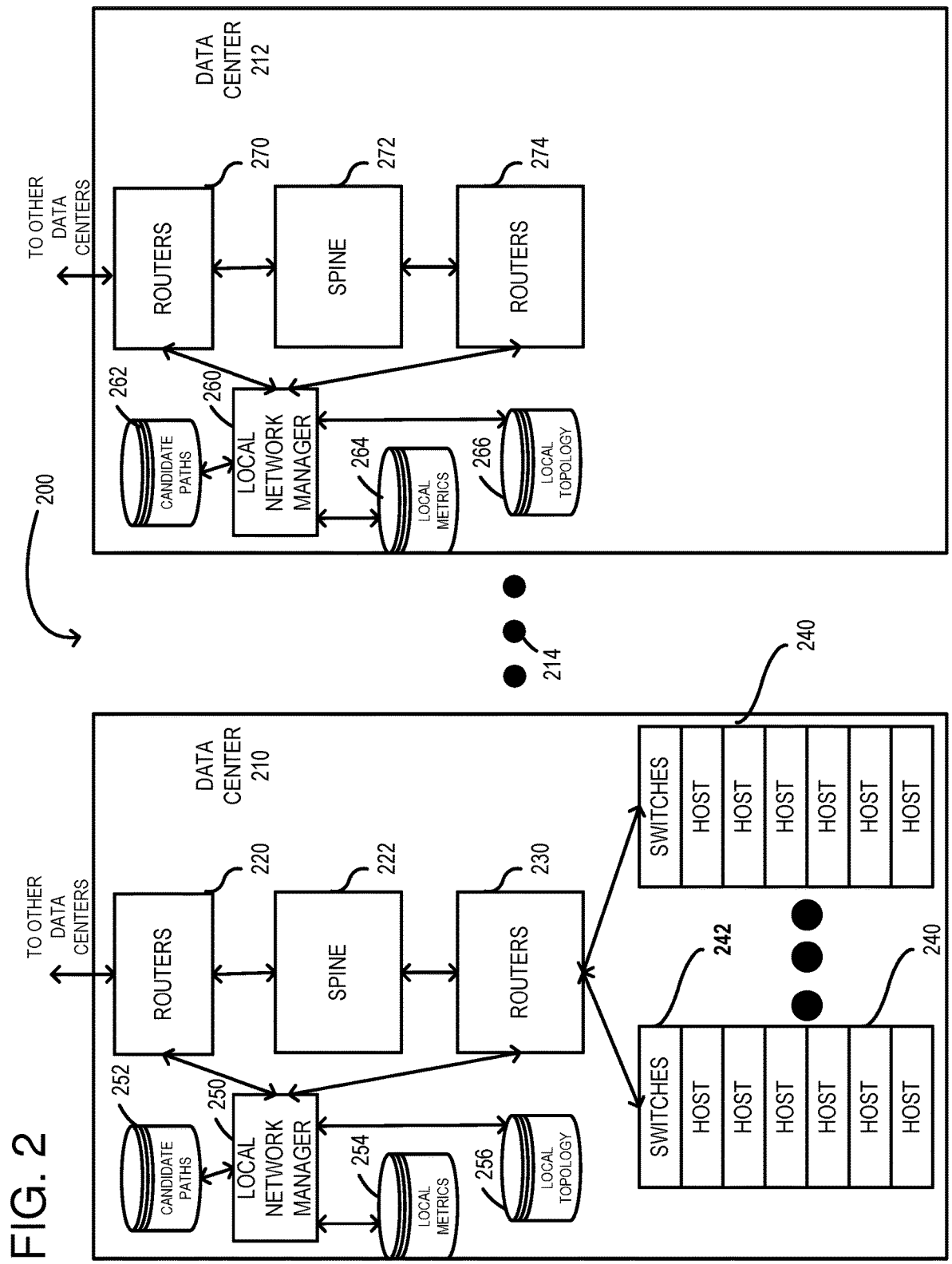
FIG. 2 shows an embodiment wherein the local network managers of FIG. 1 control routers in different data centers.

FIG. 2 illustrates a plurality of data centers 200 in which the local network managers can reside. Data centers 210 and 212 are shown, but any number of data centers are coupled together as indicated by ellipsis 214. The plurality of data centers 200 are coupled together by routers, such as routers 220 and links (not shown) between the routers. The routers 220 read address information in a received packet and determine the packet's destination. If the router decides that a different data center contains a host server computer, then the packet is forwarded to that data center. If the packet is addressed to a host in the data center, then it is passed through a layer of spine routers 222, and through any other layers of routers 230 to one or more racks of host server computers 240. Each rack 240 can include a switch 242 coupled to multiple host server computers. The routers can be in a spine-leaf configuration or other network architecture topologies. In the illustrated topology, a single local network manager 250 is positioned within data center 210. The local network manager 250 manages or controls all of the routers 220, 222, 230 in data center 210, as the routers 220, 222, 230 are considered a local group of routers. In other embodiments, different local network managers can be assigned to each group 220, 222, 230 such that the routers 220, 222, 230 are in separate groups. The local network manager 250 is coupled to databases 252, 254, and 256, which store respectively the candidate paths, the local metrics and the local topology. The candidate paths database 252 receives the candidate paths 142 from the global network manager 140. The local metrics database 252 receives metric data from the routers 220, 230, such as bandwidth information, latency information, etc. The local topology database 256 includes topology information for the routers 220, 222, 230, such as the router identification and links between the routers. Data center 212 has a different local network manager 260 having databases 262, 264, and 266 relating respectively to the candidate paths, local metrics and local topology, as previously described. As shown, the data center can have a different configuration, as data center 212 is shown as a routing data center without source/destination server computers. Thus, each local network manager, such as network manager 250, controls routers in its local network, such as in data center 210. By controlling the routers, the local network manager can program a Forwarding Information Base (FIB) in the routers to control a percentage of traffic transmitted to the other data centers.

Figure 3:
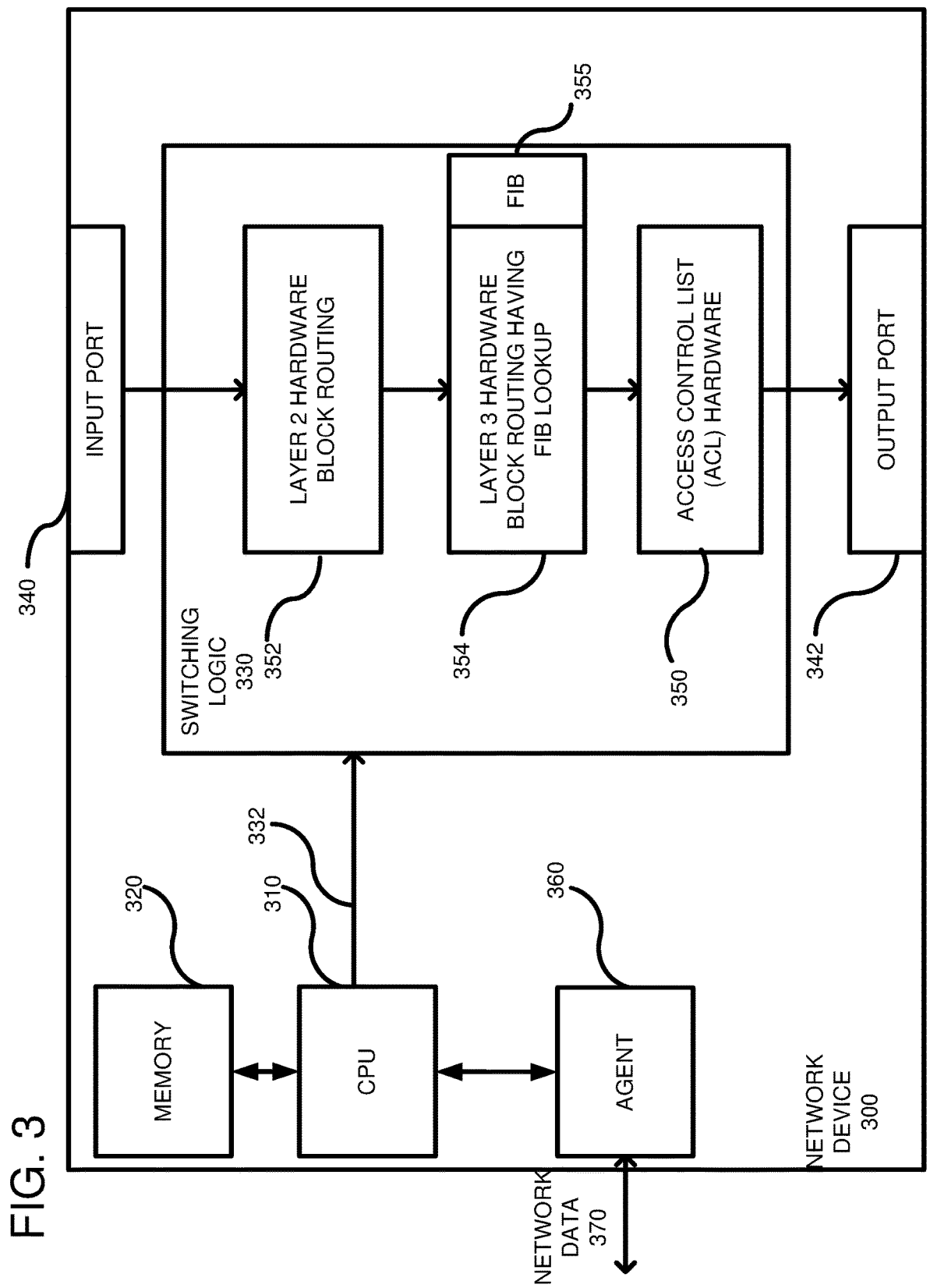
FIG. 3 is an example router that is controlled by the local network managers of FIG. 2.

FIG. 3 shows a detailed example of an embodiment of the network device 300. Network device 300 is a switch that routes packets to a next hop in the network using a destination IP address. The network device 300 is an example of any of the network devices shown in FIGS. 1 and 2. A CPU 310 is coupled to a memory 320 and to switching logic 330 through a bus 332 (PCIe or other protocols and bus types can be used). The switching logic 330 is positioned between an input port 340 and an output port 342, which are typically adapted to receive network cables, such as Ethernet cables. Although only one input port 340 and one output port 342 are shown, typically there are multiple ports (also called interfaces) on a network device. The switching logic 330 can be a single ASIC integrated circuit or divided into multiple integrated circuits. The switching logic 330 can include multiple different hardware logic blocks including a layer 2 hardware block 352, a layer 3 hardware block 354, and an Access Control List (ACL) hardware block 350. The layer 2 hardware block 352 relates to an Ethernet layer and can forward packets based on MAC tables. The layer 2 lookup ensures that an incoming packet's MAC address equals the MAC address of the network device 300. If so, then the packet can proceed onto the layer 3 hardware. If not, then the layer 3 lookup does not occur. The layer 3 hardware block 354 relates to forwarding based on a longest prefix match of an IP address. Layer 3 typically involves a route lookup, decrementing the Time-To-Live (TTL) count, calculating a checksum, and forwarding the frame with the appropriate MAC header to the correct output port. The route lookup of the layer 3 hardware can include searching within a FIB 355, which includes destination addresses (e.g., prefixes) for packets being transmitted through the switching logic and associated ports for forwarding the packets. The network device 300 can run routing protocols, such as an Open Shortest Path First (OSPF) or a Routing Information Protocol (RIP), to communicate with other Layer 3 switches or routers. The routing tables are used to lookup the route for an incoming packet. The ACL block 350 relates to permissions and can include rules whether to drop packets. The different hardware blocks can be coupled in series and additional hardware blocks can be added based on the design. Packets pass from the input port 340 to the output port in accordance with the configuration of the hardware logic blocks 350, 352, 354. The input port 340, output port 342 and switching logic 330 can be considered a data plane or forwarding plane of the network device 300. By contrast, the CPU 310, memory 320, and an agent 360 are considered part of a control plane. As shown, the agent 360 can execute on the CPU 310 and can be used to transmit latency, capacity, or other network data to the local network managers, such as network manager 250 (FIG. 2), as indicated at 370. To control the network device 300, the local network managers can program the FIB 355 to ensure the desired percentages of packets are transmitted to the adjacent waypoints (i.e., the next hops).

Figure 4:
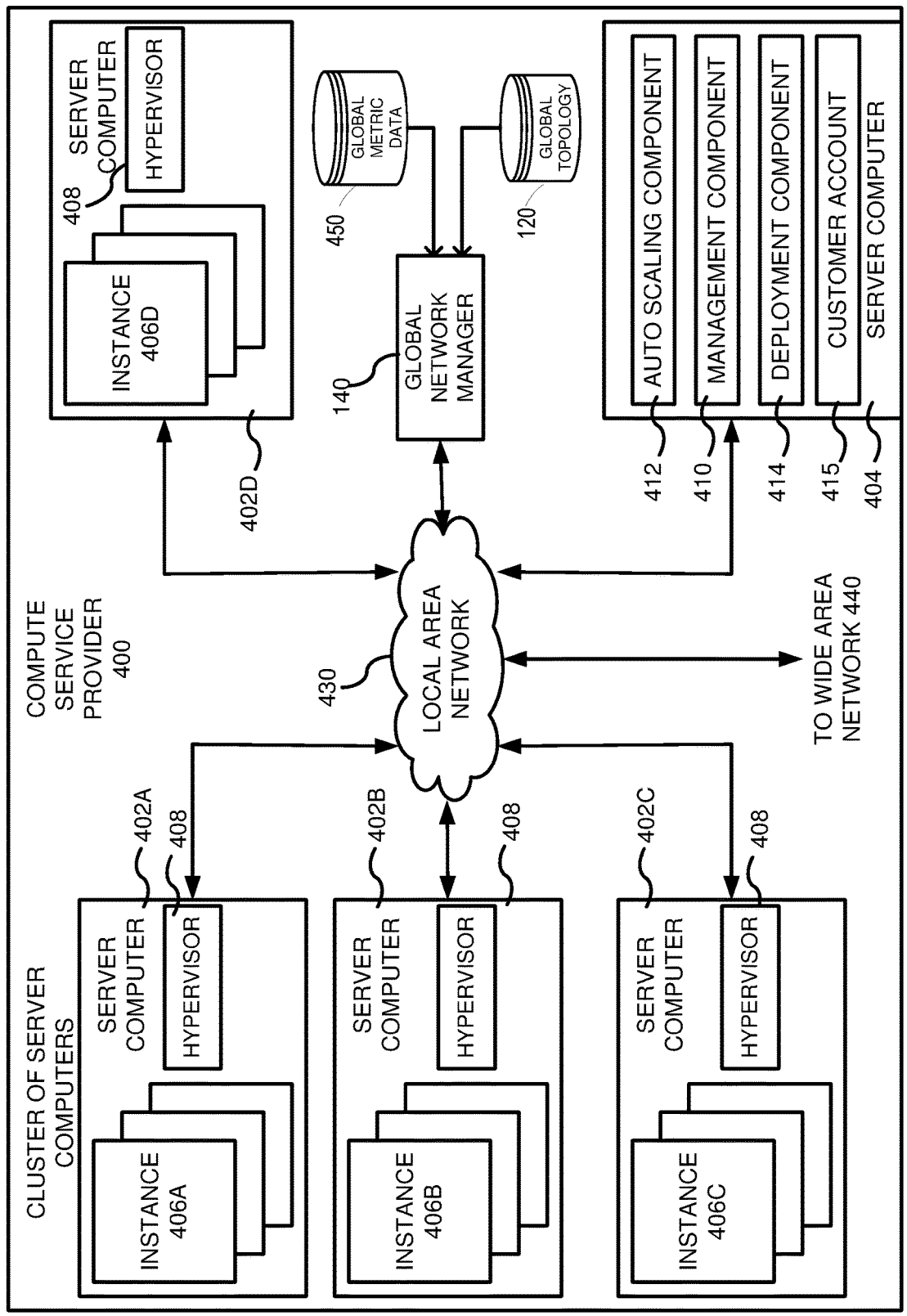
FIG. 4 is an example system diagram showing a plurality of virtual machine instances running in the multi-tenant environment with the global network manager operating in the multi-tenant environment.

FIG. 4 is a computing system diagram of a network-based compute service provider 400 that illustrates one environment in which embodiments described herein can be used. By way of background, the compute service provider 400 (i.e., the cloud provider) is capable of delivery of computing and storage capacity as a service to a community of end recipients. In an example embodiment, the compute service provider can be established for an organization by or on behalf of the organization. That is, the compute service provider 400 may offer a "private cloud environment." In another embodiment, the compute service provider 400 supports a multi-tenant environment, wherein a plurality of customers operate independently (i.e., a public cloud environment). Generally speaking, the compute service provider 400 can provide the following models: Infrastructure as a Service ("IaaS"), Platform as a Service ("PaaS"), and/or Software as a Service ("SaaS"). Other models can be provided. For the IaaS model, the compute service provider 400 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the compute service provider 400 using networked client devices, such as desktop computers, laptops, tablets, smartphones, etc. running web browsers or other lightweight client applications. Those skilled in the art will recognize that the compute service provider 400 can be described as a "cloud" environment.

In some implementations of the disclosed technology, the computer service provider 500 can be a cloud provider network. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

With cloud computing, instead of buying, owning, and maintaining their own data centers and servers, organizations can acquire technology such as compute power, storage, databases, and other services on an as-needed basis. The cloud provider network can provide on-demand, scalable computing platforms to users through a network, for example allowing users to have at their disposal scalable "virtual computing devices" via their use of the compute servers and block store servers. These virtual computing devices have attributes of a personal computing device including hardware (various types of processors, local memory, random access memory ("RAM"), hard-disk and/or solid state drive ("SSD") storage), a choice of operating systems, networking capabilities, and pre-loaded application software. Each virtual computing device may also virtualize its console input and output ("I/O") (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. Users can choose to deploy their virtual computing systems to provide network-based services for their own use and/or for use by their customers or clients.

A cloud provider network can be formed as a number of regions, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs are the primary backbone locations linking customers to the cloud provider network, and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

The cloud provider network may implement various computing resources or services that implement the disclosed techniques for TLS session management, which may include an elastic compute cloud service (referred to in various implementations as an elastic compute service, a virtual machines service, a computing cloud service, a compute engine, or a cloud compute service), data processing service (s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users of the cloud provider network, which may be provisioned in user accounts.

The particular illustrated compute service provider 400 includes a plurality of server computers 402A-402D. While only four server computers are shown, any number can be used, and large centers can include thousands of server computers. The server computers 402A-402D can provide computing resources for executing software instances 406A-406D. In one embodiment, the instances 406A-406D are virtual machines. As known in the art, a virtual machine is an instance of a software implementation of a machine (i.e. a computer) that executes applications like a physical machine. In the example of virtual machine, each of the servers 402A-402D can be configured to execute a hypervisor 408 or another type of program configured to enable the execution of multiple instances 406 on a single server. Additionally, each of the instances 406 can be configured to execute one or more applications.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 404 can be reserved for executing software components for managing the operation of the server computers 402 and the instances 406. For example, the server computer 404 can execute a management component 410. A customer can access the management component 410 to configure various aspects of the operation of the instances 406 purchased by the customer. For example, the customer can purchase, rent or lease instances and make changes to the configuration of the instances. The customer can also specify settings regarding how the purchased instances are to be scaled in response to demand. The management component can further include a policy document to implement customer policies. An auto scaling component 412 can scale the instances 406 based upon rules defined by the customer. In one embodiment, the auto scaling component 412 allows a customer to specify scale-up rules for use in determining when new instances should be instantiated and scale-down rules for use in determining when existing instances should be terminated. The auto scaling component 412 can consist of a number of subcomponents executing on different server computers 402 or other computing devices. The auto scaling component 412 can monitor available computing resources over an internal management network and modify resources available based on need.

A deployment component 414 can be used to assist customers in the deployment of new instances 406 of computing resources. The deployment component can have access to account information associated with the instances, such as who is the owner of the account, credit card information, country of the owner, etc. The deployment component 414 can receive a configuration from a customer that includes data describing how new instances 406 should be configured. For example, the configuration can specify one or more applications to be installed in new instances 406, provide scripts and/or other types of code to be executed for configuring new instances 406, provide cache logic specifying how an application cache should be prepared, and other types of information. The deployment component 414 can utilize the customer-provided configuration and cache logic to configure, prime, and launch new instances 406. The configuration, cache logic, and other information may be specified by a customer using the management component 410 or by providing this information directly to the deployment component 414. The instance manager can be considered part of the deployment component.

Customer account information 415 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, etc.

A network 430 can be utilized to interconnect the server computers 402A-402D and the server computer 404. The network 430 can be a local area network (LAN) and can be connected to a Wide Area Network (WAN) 440 so that end users can access the compute service provider 400. It should be appreciated that the network topology illustrated in FIG. 4 has been simplified and that many more networks and networking devices can be utilized to interconnect the various computing systems disclosed herein.

The global network manager 140 of FIG. 1 is coupled to a global topology database 120 and a database 450 including global metric data, which can be obtained from the network monitoring server 150 (FIG. 1). The global network manager 140 can operate on a server computer and can also be an instance executing on the server computer in a compute service provider 400. Using the global metric data and global topology, the global network manager 140 can make suggestions to the local network managers regarding candidate paths that should be used in directing network traffic.

Figure 5:
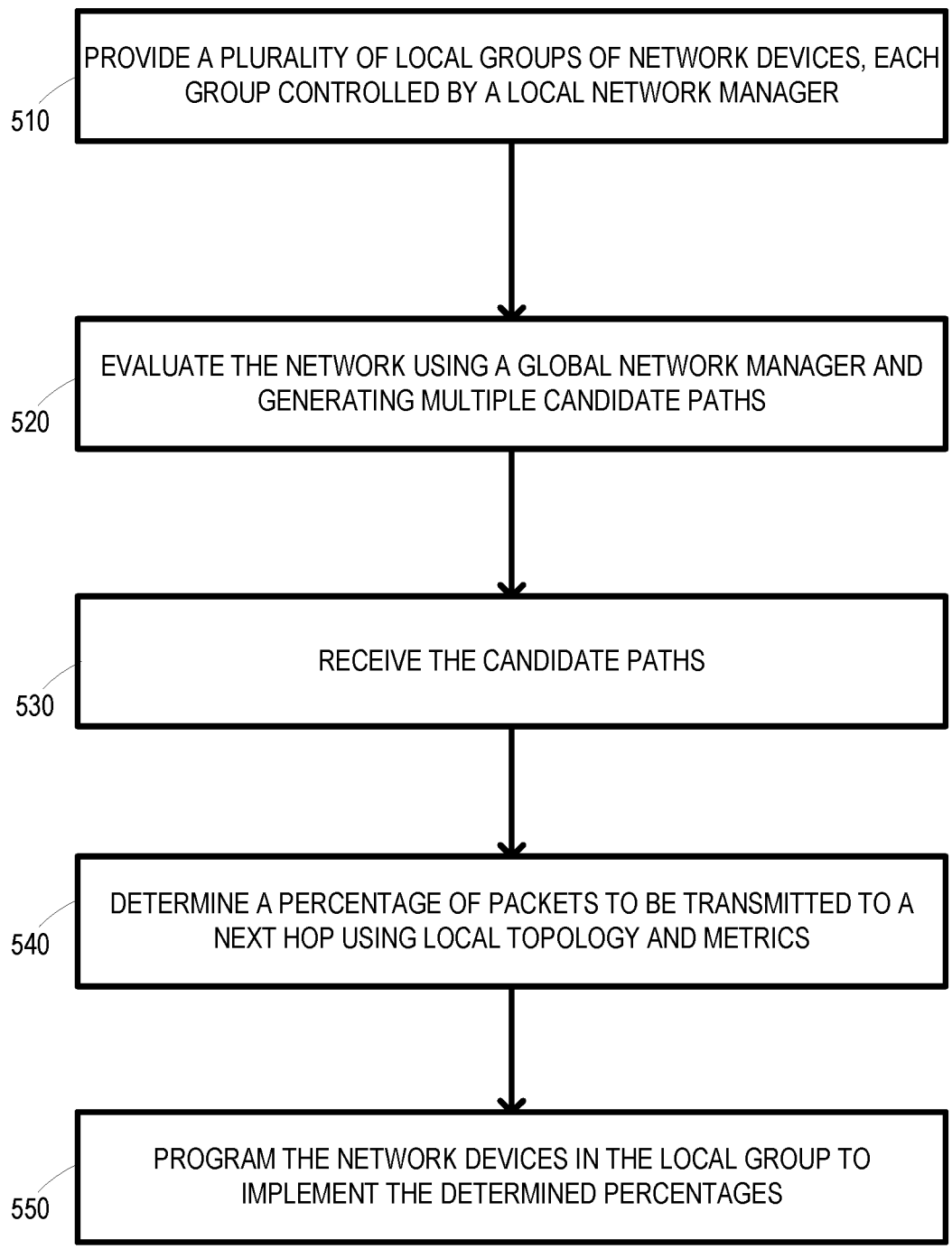
FIG. 5 is a flowchart according to one embodiment for directing network traffic using local routing decisions with assistance from the global network manager.

FIG. 5 is a flowchart according to one embodiment for directing network traffic by programming network devices using a local network manager with guidance from a global network manager. In process block 510, a plurality of local groups of network devices are provided with each group controlled by a local network manager. For example, in FIG. 2, local groups of network devices (in this case routers) can be based on a geographic region in which the network devices are located, such as in a data center 210. A separate local group of network devices is shown in data center 212. Each data center is associated with its own local network manager 250, 260. In process block 520, the network is evaluated using a global network manager that generates multiple candidate paths. For example, in FIG. 1, different candidate paths 148a, 148b, 148c are shown and are generally in a ranked order. In process block 530 the candidate paths are received in the local network managers, such as is shown at 142 in FIG. 1. The candidate paths are suggestions to the local network managers about desired paths for network traffic through the network. The paths can include the full path information between a source and destination including many hops. However, the local network managers can decide to use a path other than the candidate paths. In process block 540, a percentage of packets are determined to be transmitted to a next hop using local topology and local metrics. For example, in FIG. 1, the local network manager 130 can use the local topology 162 and the local metrics 164 to assign weights to different paths. The local network manager 130 does not decide the full path as does the global network manager, but just the next hop or possibly multiple hops if such hops are included in the group of network devices under the control of the local network manager. The weights can then be converted to percentages. In process block 550, the network devices are programmed in the local group to implement the desired percentages. For example, in FIG. 3, the FIB 355 can be programmed to include next hop information for desired prefixes. Thus, new packets received in the network device are routed according to the updated FIB 355.

Figure 6:
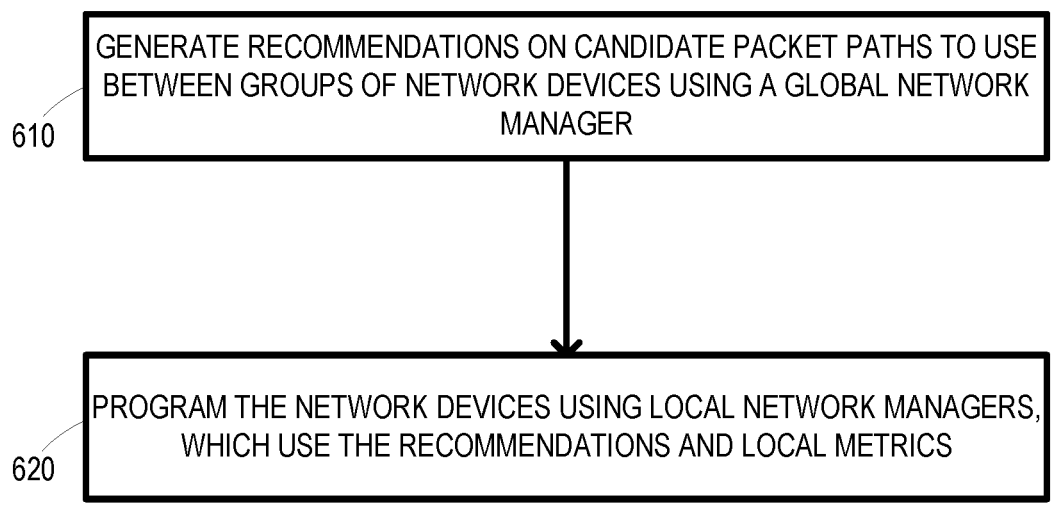
FIG. 6 is a flowchart according to another embodiment for directing network traffic using local routing decisions with assistance from the global network manager.

FIG. 6 is a flowchart according to another embodiment for directing network traffic by programming network devices using a local network manager with recommendations from a global network manager. In process block 610, recommendations are generated on candidate packet paths to use between groups of network devices. The recommendations are generated by a global network manager. For example, in FIG. 1, the global network manager 140 generates multiple candidate paths, such as is shown by paths 148. In process block 620, the network devices are programmed by using local network managers, which use the recommendations and the local metrics. For example, in FIG. 1, the local network managers 130 use the candidate paths 142 (recommendations) from the global network manager and local metrics 164 to program the local network devices, such as routers, by updating the FIBs on the network devices (see FIB 355, FIG. 3) to program next hops for switched packets.

Figure 7:
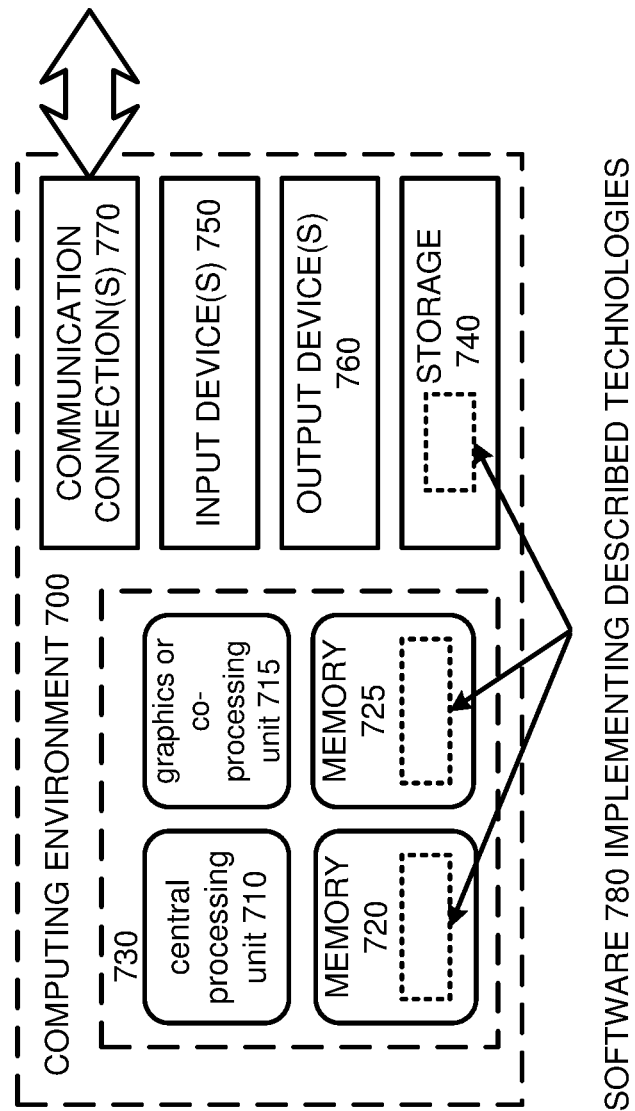
FIG. 7 depicts a generalized example of a suitable computing environment in which the described innovations may be implemented.

FIG. 7 depicts a generalized example of a suitable computing environment 700 in which the described innovations may be implemented. The computing environment 700 is not intended to suggest any limitation as to scope of use or functionality, as the innovations may be implemented in diverse general-purpose or special-purpose computing systems. For example, the computing environment 700 can be any of a variety of computing devices (e.g., desktop computer, laptop computer, server computer, tablet computer, etc.).

With reference to FIG. 7, the computing environment 700 includes one or more processing units 710, 715 and memory 720, 725. In FIG. 7, this basic configuration 730 is included within a dashed line. The processing units 710, 715 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 7 shows a central processing unit 710 as well as a graphics processing unit or co-processing unit 715. The tangible memory 720, 725 may be volatile memory (e.g., registers, cache, RAM), non-volatile memory (e.g., ROM, EEPROM, flash memory, etc.), or some combination of the two, accessible by the processing unit(s). The memory 720, 725 stores software 780 implementing one or more innovations described herein, in the form of computer-executable instructions suitable for execution by the processing unit(s).

In some embodiments, the computing environment 700 can be used for implementing either the global network manager 140 or the local network manager 130.

A computing system may have additional features. For example, the computing environment 700 includes storage 740, one or more input devices 750, one or more output devices 760, and one or more communication connections 770. An interconnection mechanism (not shown) such as a bus, controller, or network interconnects the components of the computing environment 700. Typically, operating system software (not shown) provides an operating environment for other software executing in the computing environment 700, and coordinates activities of the components of the computing environment 700.

The tangible storage 740 may be removable or non-removable, and includes magnetic disks, magnetic tapes or cassettes, CD-ROMs, DVDs, or any other medium which can be used to store information in a non-transitory way and which can be accessed within the computing environment 700. The storage 740 stores instructions for the software 780 implementing one or more innovations described herein.

The input device(s) 750 may be a touch input device such as a keyboard, mouse, pen, or trackball, a voice input device, a scanning device, or another device that provides input to the computing environment 700. The output device(s) 760 may be a display, printer, speaker, CD-writer, or another device that provides output from the computing environment 700.

The communication connection(s) 770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, aspects of the disclosed technology can be implemented by software written in C++, Java, Perl, any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. A method of routing traffic through a network, the method comprising:
   providing a global network manager and a plurality of local groups of network devices in the network, wherein each local group is controlled by a local network manager;
   by the global network manager:
      analyzing global topology and global demand of the network;
      evaluating the network by evaluating adjacent local groups of each of the plurality of local groups; and
      using the evaluation of the network, generating multiple candidate packet paths between the plurality of local groups, wherein the multiple candidate packet paths are computed at a first frequency;
  by each local network manager in a local group:
    receiving the multiple candidate packet paths from the global network manager;
    determining, using local topology and local packet metrics, a percentage of packets to be transmitted to a next hop in the candidate packet paths, wherein the determining by the local network manager occurs at a second frequency, which is faster than the first frequency; and
    programming the network devices in the local group to implement the determined percentage, wherein the programming includes updating a Forwarding Information Base (FIB) on the network devices.

2. The method of claim 1, wherein the generating of the multiple candidate packet paths includes analyzing traffic between a source to a destination including determining the candidate packet paths between the source and the destination, determining a bandwidth on the multiple candidate packet paths, determining a latency of the multiple candidate packet paths, and ranking the multiple candidate packet paths based upon the determined bandwidth and the determined latency.

3. The method of claim 2, wherein the determining the percentage of packets includes using the ranking provided by the global network manager.

4. The method of claim 1, wherein the local packet metrics include bandwidth and latency of links between the plurality of local groups.

5. The method of claim 1, wherein each local group is a data center and the network devices are switches within the data center.

6. A method, comprising:
  generating recommendations on candidate packet paths to use between groups of network devices using a global network manager that analyzes global topology and global demand of a network, evaluates adjacent groups of the network devices, and analyzes traffic in the network formed by the groups of network devices, wherein the generating of the recommendations occurs at a first frequency; and
  programming the network devices by updating a Forwarding Information Base (FIB) in each of the groups using local network managers, wherein the local network managers program the network devices based upon the recommendations on the candidate packet paths generated by the global network manager and received by the local network managers from the global network manager and metrics associated with a respective group of network devices controlled by the local network managers, wherein the programming of the network devices by the local network managers occurs at a second frequency, greater than the first frequency.

7. The method of claim 6, wherein the local network managers determine a percentage of network traffic to direct to a set of network devices controlled by another network manager based upon the metrics.

8. The method of claim 6, wherein the generating of the recommendations includes analyzing traffic between a source to a destination including determining the candidate packet paths between the source and the destination, determining a bandwidth on the candidate packet paths, determining a latency of the candidate packet paths, and ranking the candidate packet paths based upon the determined bandwidth and the determined latency.

9. The method of claim 6, wherein each group of network devices is a different data center in a different geographic location and one of the local network managers is positioned in each of the data centers.

10. The method of claim 6, wherein the candidate packet paths are ranked by the global network manager based on latency and bandwidth.

11. The method of claim 6, further including breaking the candidate packet paths into sub-paths and determining a percentage of network traffic to direct to each next hop.

12. The method of claim 7, wherein the metrics include latency and bandwidth.

13. The method of claim 10, wherein the local network managers determine a percentage of network traffic to transmit over each of the candidate packet paths and wherein the determining the percentage includes using the ranking provided by the global network manager.

14. The method of claim 11, further including analyzing a capacity of links in each sub-path and expected performance of each sub-path.

15. A system, comprising:
  a global network manager that analyzes global topology and global demand of a network, evaluates adjacent local groups of network devices in the network, analyzes traffic patterns in the network and provides recommended paths through the network, wherein the global network manager is configured to provide the recommended paths at a first frequency; and
  a plurality of local network managers coupled to the global network manager that receive the recommended paths through the network provided by the global network manager, determine a percentage of network traffic to transmit to a next hop in the recommended paths and program local network devices based upon the determination, wherein the plurality of local network managers determine the percentage of network traffic to transmit at a second frequency, faster than the first frequency.

16. The system of claim 15, wherein each of the plurality of local network managers control network devices in a respective data center, and wherein the recommended paths include links between data centers.

17. The system of claim 16, wherein the recommended paths through the network are from a source server computer, through multiple of the network devices in the data centers, and to a destination server computer.

18. The system of claim 16, wherein the determining of the percentage of network traffic includes analyzing bandwidth and latency in the respective data center.

19. The system of claim 15, wherein the global network manager generates the recommended paths and the generating includes analyzing traffic between a source and a destination including determining the recommended paths between the source and the destination, determining a bandwidth on the recommended paths, determining a latency of the recommended paths, and ranking the recommended paths based upon the determined bandwidth and the determined latency.

20. The system of claim 15, wherein each local network manager is configured to convert the recommended paths into sub-paths and determine a percentage of network traffic to be transmitted to a next hop on the sub-paths.

* * * * *